United States Patent
Shiga et al.

(10) Patent No.: US 6,657,328 B2
(45) Date of Patent: Dec. 2, 2003

(54) ROTOR FOR ELECTRIC MOTOR AND METHOD OF MAKING THE SAME

(75) Inventors: Tsuyoshi Shiga, Nagoya (JP); Masami Endou, Handa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/983,225

(22) Filed: Oct. 23, 2001

(65) Prior Publication Data

US 2002/0047427 A1 Apr. 25, 2002

(30) Foreign Application Priority Data

Oct. 24, 2000 (JP) ........................... 2000-323975

(51) Int. Cl.[7] ................................................ H02K 1/22
(52) U.S. Cl. .............................................. 310/26; 310/156
(58) Field of Search ................. 310/156.08, 156.01, 310/156.21, 156.26, 156.06, 74, 156.05, 68 D

(56) References Cited

U.S. PATENT DOCUMENTS

| | | | |
|---|---|---|---|
| 4,547,758 A | * 10/1985 | Shimizu et al. | ............. 335/302 |
| 5,220,227 A | 6/1993 | Ohi | |
| 5,610,464 A | * 3/1997 | Asano et al. | .......... 310/156.45 |
| 5,717,268 A | * 2/1998 | Carrier et al. | ............... 310/156 |
| 5,783,880 A | * 7/1998 | Teshima et al. | ....... 310/156.13 |
| 5,907,206 A | 5/1999 | Shiga et al. | |
| 6,093,984 A | * 7/2000 | Shiga et al. | ........... 310/156.05 |

FOREIGN PATENT DOCUMENTS

| | | |
|---|---|---|
| JP | 59144351 | 8/1984 |
| JP | 04207945 | 7/1992 |
| JP | 08126265 | 5/1996 |
| JP | 09047002 | 2/1997 |

* cited by examiner

Primary Examiner—Nestor Ramirez
Assistant Examiner—Nguyen Hanh
(74) Attorney, Agent, or Firm—Pillsbury Winthrop LLP

(57) ABSTRACT

A rotor for an electric motor includes a frame previously formed and fixed to a rotational shaft of the motor so as to be rotated with the rotational shaft, and a magnet molded from a molten magnetic resin so as to be disposed at a stator side of the frame and so as to be integrated with the frame.

9 Claims, 7 Drawing Sheets

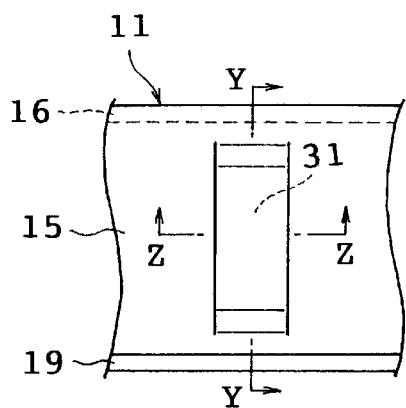 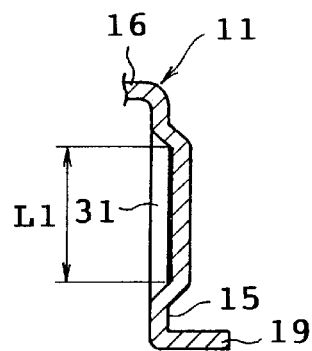 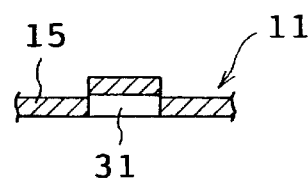
FIG.8A  FIG.8B  FIG.8C
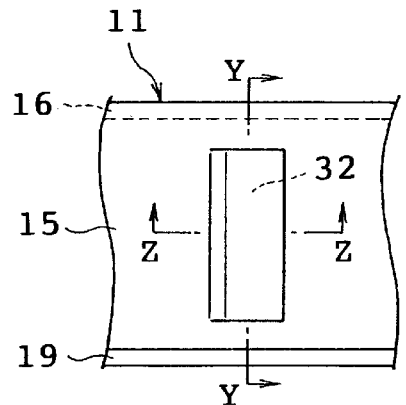 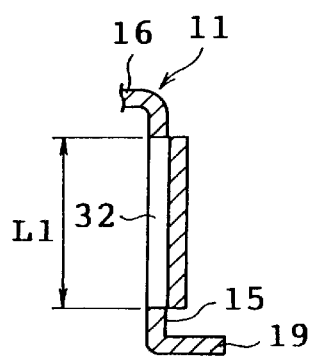 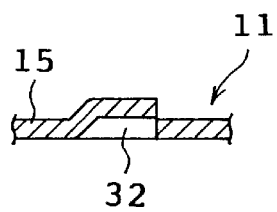
FIG.9A  FIG.9B  FIG.9C
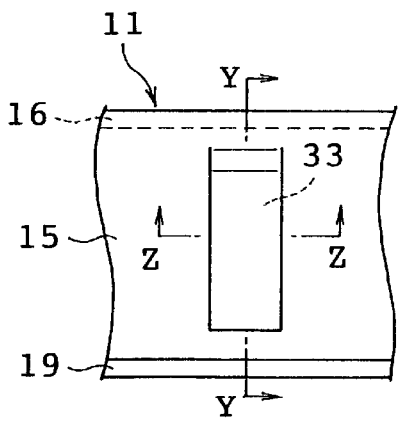 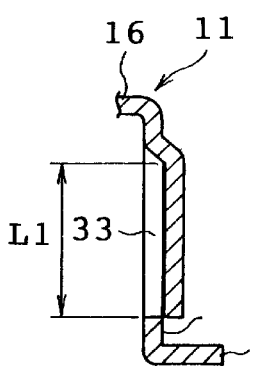 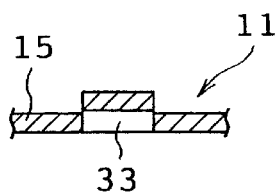
FIG.10A  FIG.10B  FIG.10C

ROTOR FOR ELECTRIC MOTOR AND METHOD OF MAKING THE SAME

BACKGROUND OF THE INVENTION

1. Field of the Invention

This invention relates to a rotor for an electric motor which comprises a frame and magnets provided on the frame and a method of making the rotor.

2. Description of the Related Art

FIG. 13 illustrates a three-phase brushless DC motor of the outer rotor type in which a rotor is disposed outside a stator. The motor is designated by reference numeral 101. The motor 101 comprises a stator 102 and a rotor 103. The stator 102 includes a stator core 104 formed by laminating a number of silicon steel plates. The stator core 104 includes an annular yoke 105 and a number of teeth 106 protruding outward from the yoke 105. An insulating resin end plate 107 made of a synthetic resin is mounted on an outer face of the stator core 104. The end plate 107 includes coil winding portions 108 located so as to cover the teeth 106. Coils 109 are wound on the coil winding portions 108. Thus, the coil winding portions 108 constitute an insulation layer between the stator core 104 and the coils 109.

A plurality of mounting portions 112 having mounting holes 112a are formed in an inner circumferential side of the stator core 104. Only one of the mounting holes 112a is shown. A bolt 113 is inserted through each mounting hole 112a, and a distal end of each bolt 113 is further inserted through a hole (not shown) of a stator fixing portion 114. A nut 113a is engaged with each bolt 113 so that the stator 102 is fixedly mounted on the stator fixing portion 114 further fixed to the mounting plate 115.

On the other hand, the rotor 103 is disposed outside the stator 102 so as to cover the latter radially outward. The rotor 103 includes a generally cup-shaped frame 1 made of a synthetic resin. A rotational shaft 118 is fixed to a boss 117 further fixed to a central bottom of the frame 1. The rotational shaft 118 is rotatably supported on bearings 121 and 122 provided on the stator fixing portion 114 and the mounting plate 115 respectively.

Magnets 2 made by sintering ferrite are disposed on an inner circumferential portion of the frame 1 of the rotor 103. The number of the magnets 2 is equal to the number of magnetic poles. A resin 3 is provided on the outer and inner circumferential portions of the frame 1 to integrate the frame 1 and the magnets 2. Each magnet 2 has an inner face opposed to the distal end face of each tooth 106 with a predetermined gap therebetween.

The resin 3 is used only to integrate the frame 1 and the magnets 2 in the above-described rotor 103 but not useful for improving characteristics of the motor. Nonetheless, the resin 3 occupies a large space and accordingly increases the size, weight and costs of the rotor 103 and accordingly, of the motor. Furthermore, in forming the rotor 103, the frame 1 is placed in a molding die (not shown) used to form the resin 3, and the sintered magnets 2 are disposed at the inner circumferential side of the frame 1. However, molding steps are complicated and reduce a manufacturing efficiency.

Further, final positions of the magnets 2 depend upon the resin 3 which is thereafter poured into the forming die to be formed. Accordingly, the molding sometimes results in variations in the positions of the magnets 2, thereby reducing the accuracy in the positions of the magnets 2. Additionally, since the resin 3 is formed over the outer and inner circumferential faces of the frame 1, the rotor 103 is hard to be decomposed in disposition.

SUMMARY OF THE INVENTION

Therefore, an object of the present invention is to provide a rotor for the electric motor whose size, weight and cost can be reduced, which can improve the manufacturing efficiency and can readily be disassembled when disposed of and in which the accuracy in the final positions of the magnets can be improved, and a method of making the rotor.

The present invention provides a rotor for an electric motor including a rotational shaft and a stator having a stator core, comprising a frame previously formed and fixed to the rotational shaft of the motor so as to be rotated with the rotational shaft, and a magnet molded from a molten magnetic resin so as to be disposed at a stator core side of the frame and so as to be integrated with the frame.

According to the above-described rotor, the magnets are made from the magnetic resin so as to be disposed at the stator core side of the frame. Accordingly, since the frame and magnets can be integrated with each other, the resin need not be provided only to integrate the frame and the magnets. Furthermore, components for the magnets need not be disposed at the stator core side of the frame one by one, and the final positions of the magnets are not affected by the result of molding from the resin. Additionally, the resin need not be disposed over the outer and inner circumferential faces of the frame.

In a preferred form, the magnet is anisotropic with respect to poles thereof. Consequently, the magnet can be formed so that the magnetic pole possesses a large magnetic force. In another preferred form, the frame has an axially elongated hole or a plurality of axially aligned holes at a position between magnetic poles of the magnet with respect to the rotational shaft. Consequently, magnetic flux is prevented from leaking through the frame by the elongated hole or axially aligned holes when the magnet is rendered anisotropic. Further, since the magnetic resin fills the elongated hole or axially aligned holes, the strength of the magnet relative to the frame can be improved.

In further another preferred form, the magnet is formed so that a central portion of each magnetic pole has a thickness larger than the other portion thereof. An air gap between each magnetic pole of the magnet is smallest at the central portion of the magnetic pole and largest at both ends of the magnetic pole. Accordingly, the magnetic resistance in the air gap is smallest at the central portion of each magnetic pole and largest at both ends of the magnetic pole. Since the distribution of flux density in the air gap is approximated to a sine wave when regarded as a wave, torque ripple is reduced such that vibration and noise can be reduced.

In further another preferred form, the magnet has an end and a portion opposite the stator and is magnetized so that the end has a larger number of magnetic poles than the portion opposite the stator. Consequently, a rotational position signal can be detected with high accuracy by the magnetic poles of the magnet end.

BRIEF DESCRIPTION OF THE DRAWINGS

Other objects, features and advantages of the invention will become clear upon reviewing of the following description of embodiments, made with reference to the accompanying drawings, in which:

FIGS. 8A to 8C are a front view of a part of the rotor of a second embodiment in accordance with the invention, a view taken along line Y—Y in FIG. 8A, and a view taken along line Z—Z in FIG. 8A respectively;

FIGS. 9A to 9C are views similar to FIGS. 8A to 8C respectively, showing the rotor of a third embodiment in accordance with the invention;

FIGS. 10A to 10C are views similar to FIGS. 8A to 8C respectively, showing the rotor of a fourth embodiment in accordance with the invention;

DETAILED DESCRIPTION OF EMBODIMENTS

Figure 1:
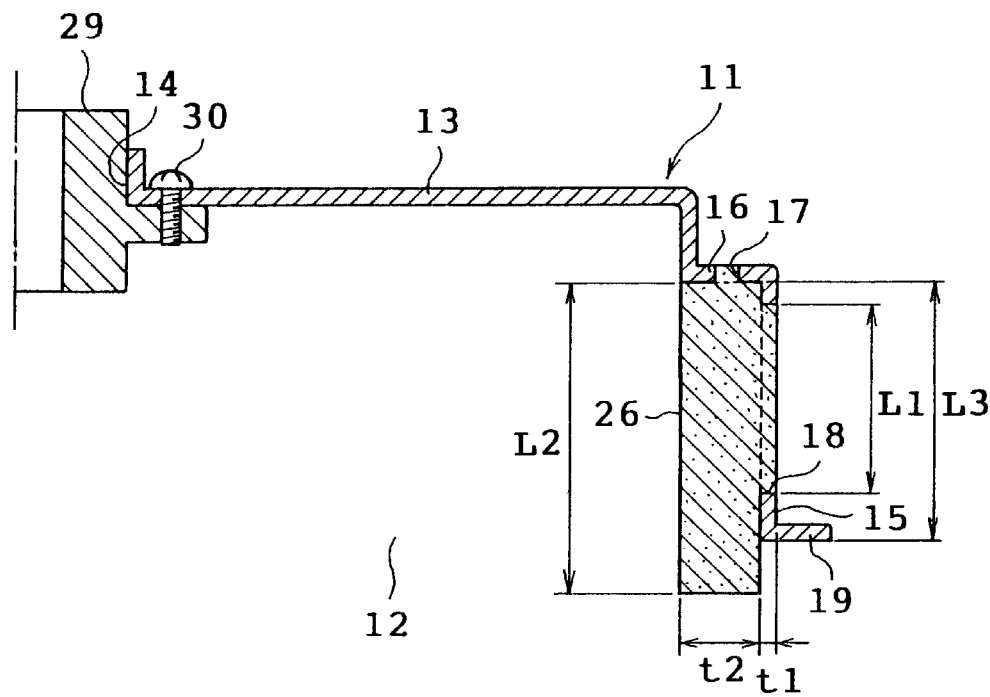
FIG. 1 is a longitudinal section of one half of a rotor of a first embodiment in accordance with the present invention.

A first embodiment of the present invention will be described with reference to FIGS. 1 to 7 of the accompanying drawings. The invention is applied to a rotor for an electric motor of the outer rotor type in which the rotor is disposed outside a stator. Referring to FIG. 1, a frame 11 of the rotor is shown. The frame 11 is formed by pressing a magnetic material such as steel plate into the shape of a flat bottomed cylindrical cup. The frame 11 has a lower open end 12 and a bottom 13 located opposite the opening as viewed in FIG. 1. The bottom 13 of the frame 11 has a centrally located through hole 14 serving as a shaft support mounting hole.

Figure 2:
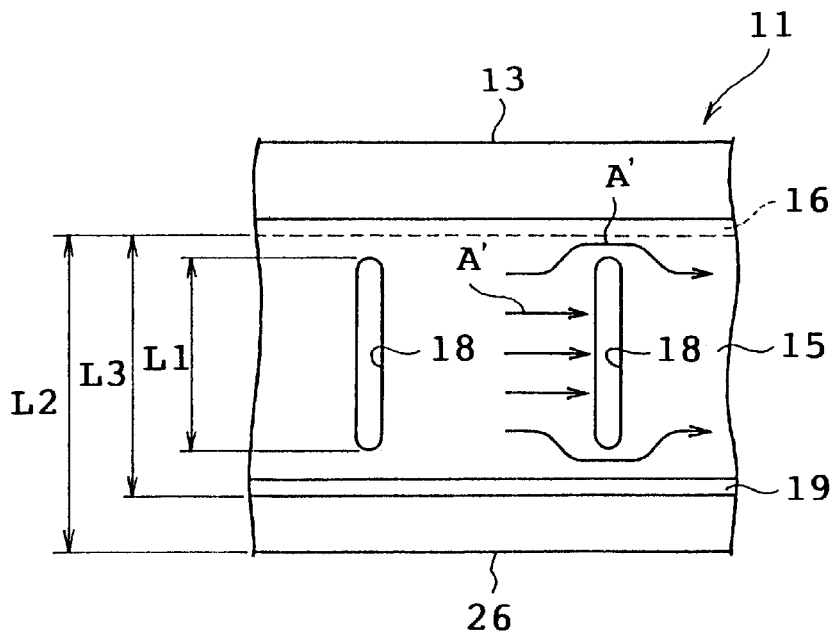
FIG. 2 is a front view of a part of the rotor.

The frame 11 includes an annular side wall 15 formed along a circumference thereof and a stepped portion 16 formed in an axial middle of the side wall 15 at the bottom 13 side. The stepped portion 16 has through holes 17 and the side wall 15 also has through holes 18. Each hole 17 is formed into a radial or circular shape, whereas each hole 18 is formed into an axially elongated shape, as shown in FIG. 2. The side wall 15 includes an edge or circumferential edge of the open end 12 from which a flange 19 protrudes outward.

Figure 3:
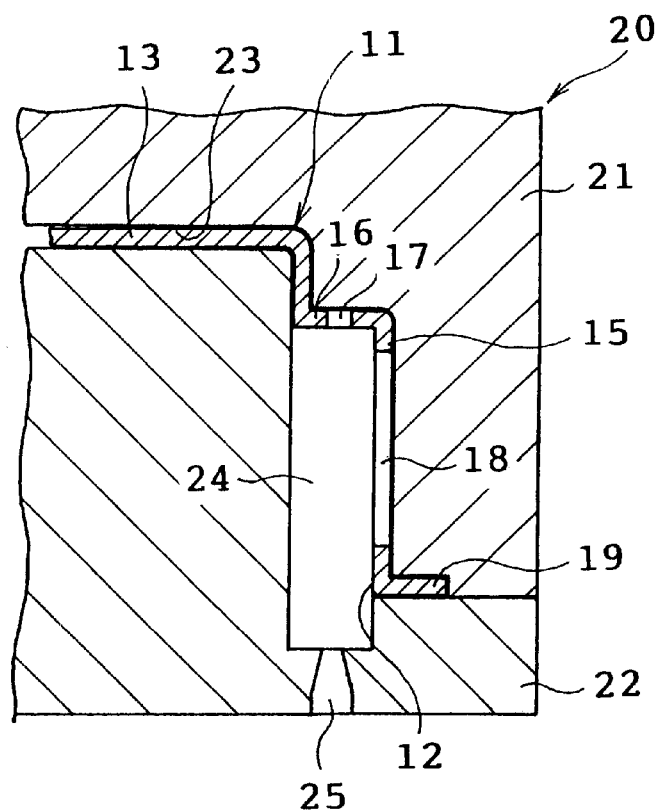
FIG. 3 is a longitudinal section of a part of a molding die with a frame being set in the die.

FIG. 3 shows a molding die 20 including an upper die 21 and a lower die 22. The upper die 21 has a cavity 23 in which the frame 11 is enclosed. The lower die 22 has a forming cavity 24 with a contour of a magnet and gates 25 communicating with the cavity from outside. The cavity 24 is defined by an inner circumferential face of the side wall 15 and an inner face of the stepped portion 16 of the frame 11. The gates 25 are located at the open end 12 side of the frame 11. The frame 11 is set in the lower die 22, and the upper die 21 is then combined with the lower die 22 so that the frame 11 is enclosed in the cavity 23. Thereafter, a molten magnetic resin is poured through the gates 25 into the cavity 24 and the holes 17 and 18 of the frame 11. The magnetic resin is a mixture of plastic serving as a binder and granular magnetic substance comprising a system of NdFe, SmFe or SmCo.

The molten magnetic resin is poured into the forming die 20 and thereafter solidified so that an injection molding is carried out thereby to obtain a shape conforming to the cavity 24 defined by the inner circumferential face of the side wall 15 and the inner face of the stepped portion 16 of the frame 11 and the holes 17 and 18.

Figure 4:
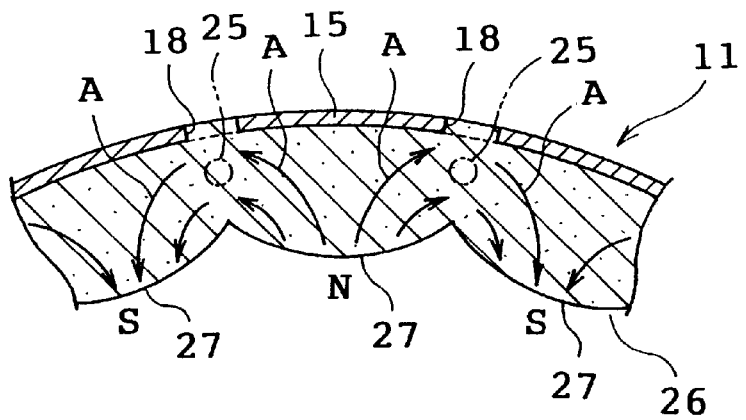
FIG. 4 is a transverse section of a part of the rotor.
Figure 5:
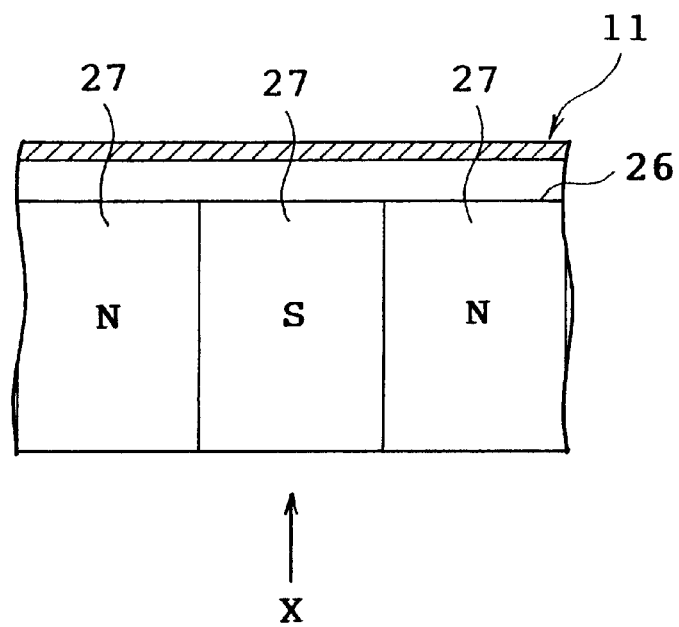
FIG. 5 illustrates an inside of a part of the rotor.
Figure 6:
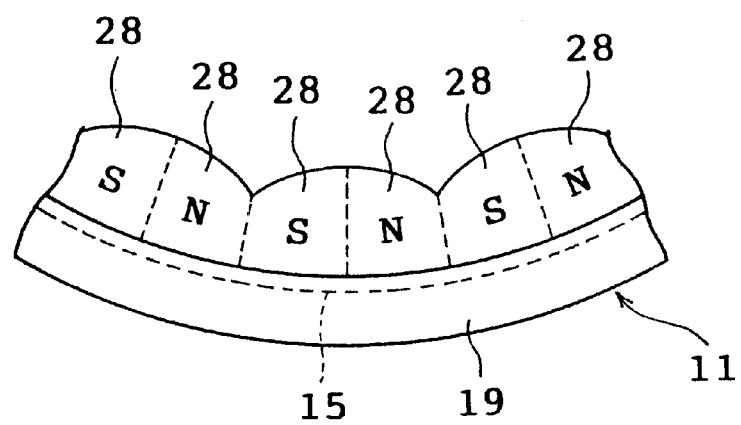
FIG. 6 is a partial bottom view of the rotor as taken in the direction of arrow X in FIG. 5.
Figure 13:
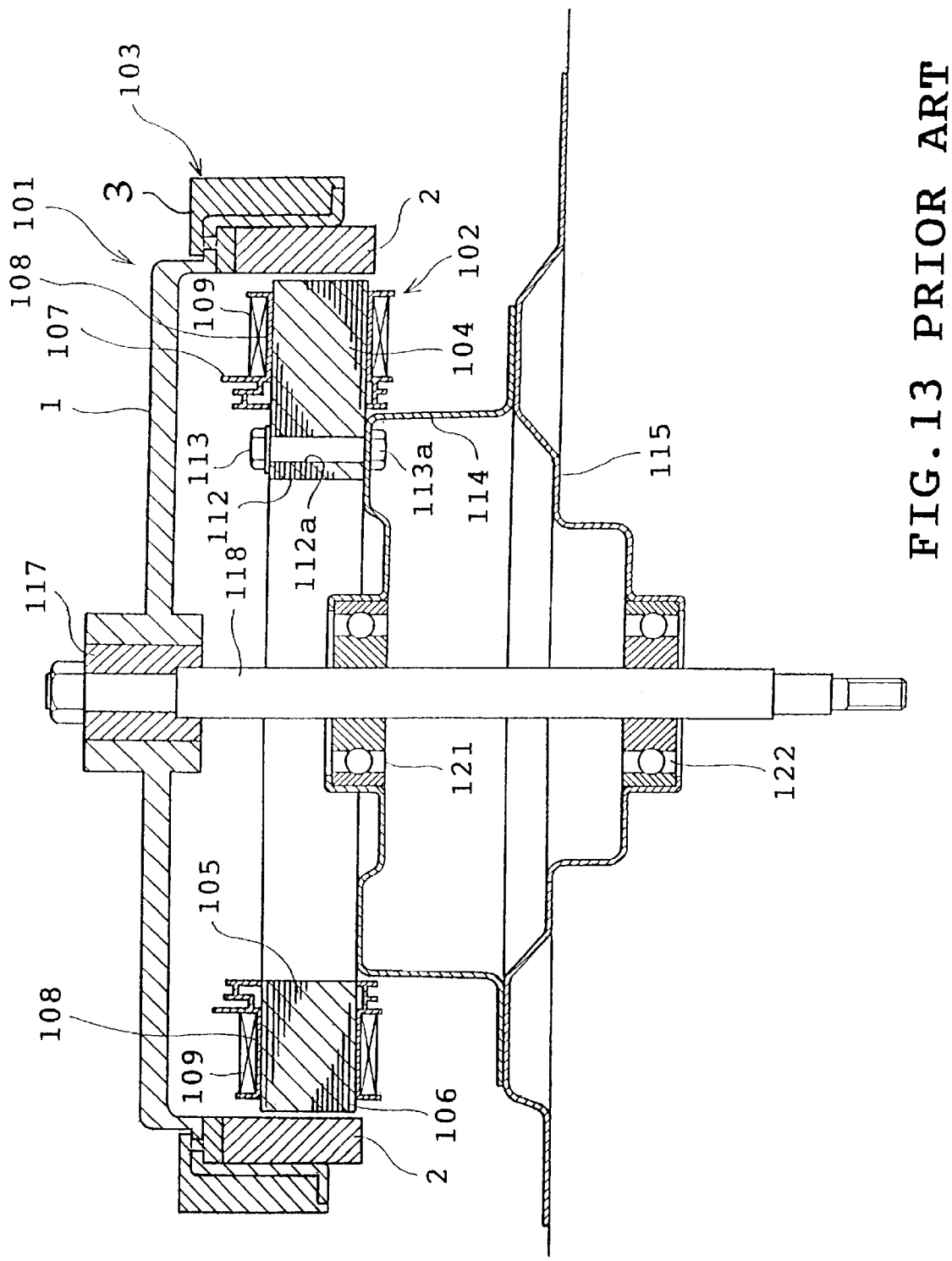
FIG. 13 is a sectional view of a conventional electric motor.

FIG. 4 illustrates the frame 11 released from the die 20 after the molding and a magnet 26 formed on the inner circumferential face of the side wall 15. The magnet 26 is secured to the inner faces of the stepped portion 16, side wall 15 and the holes 17 and 18 respectively, thereby being integrated with the frame 11. A stator (not shown) has the same construction as shown in FIG. 13.

A magnetic field is applied only between magnetic poles 27 for magnetic permeation until the magnetic resin is solidified during the molding as shown by arrows A in FIG. 4. As a result, the orientation of magnetic particles contained in the magnetic resin has anisotropy, namely, the magnet 26 is anisotropic with respect to poles thereof.

Each hole 18 is located between magnetic poles 27 of the magnet 26. Each hole 18 has a length L1 equal to or larger than one half of an axial dimension L2 of the magnet 26 (L1/L2≧½). Further, the frame 11 includes a portion integrated with the magnet 26, and the integrated portion has an axial dimension L3 shorter than the axial dimension L2 of the magnet 16 (L3<L2). Additionally, the frame 11 has a thickness t1 equal to or smaller than 20% of a thickness t2 of the magnet 26 (t1/t2≦20 (%)). Furthermore, each magnetic pole 27 of the magnet 26 has a thickness gradually increasing from both ends thereof toward a central portion thereof. The thickness t2 refers to a maximum thickness of the central portion of each magnetic pole 27. FIG. 4 also shows the aforesaid gates 25. The gates 25 have the same number as the magnetic poles 27 and are arranged at regular intervals with each one being located between two magnetic poles 27 adjacent to each other. The magnetic poles 27 of the magnet 26 are magnetized after the molding. The magnet 26 has an end protruding from the frame 11 or an end face (underside in FIG. 1) on which magnetic poles 28 are magnetized. The magnetic poles 28 has the number twice as large as that of the magnetic poles 27. A shaft support 29 is inserted through the mounting hole 14. The frame 11 is mounted to the shaft support 29 by screws 30. The rotational shaft 118 in FIG. 13 is inserted through a hole (not shown) of the shaft support 29 so as to be supported thereon.

According to the above-described embodiment, the magnet 26 is molded from the magnetic resin at the stator 102 side of the previously formed frame 11 fixed to the rotational shaft 118, so that the frame 11 and magnet 26 are integrated together. Consequently, the resin is not required only for integrating the frame and magnet, and the size, weight and manufacturing cost of the rotor can be reduced. Further, since no magnetic components such as the sintered magnets are disposed one by one at the stator side of the frame, the manufacturing efficiency can be improved. Further, since the final position of the magnet 26 is not affected by the molding from the resin, the accuracy in the final position of the magnet can be improved and accordingly, the motor characteristics can be improved. Additionally, the magnet 26 is disposed at the stator 102 side of the frame 11, and the resin is prevented from being formed over the outer and inner circumferential faces of the frame 11, the rotor can easily be disassembled when the motor is disposed of.

Particularly in the foregoing embodiment, the stepped portion 16 is formed in the axial middle of the side wall 15 of the frame 11, and the magnet 26 is molded from the molten magnetic resin poured to the stepped portion 16. Accordingly, the face of the magnet 26 opposite the stator 102 is secured to the frame 11, and the face of the magnet 26 at the frame bottom 13 side is also secured to the frame 11. Consequently, the strength of the magnet 26 relative to the frame 11 can be improved.

The stator 102 is disposed to be spaced away from the bottom 13 of the frame 11 by a predetermined distance so that the stator can be prevented from coming into contact with the bottom 13 and a predetermined insulation distance is maintained between the stator 102 and the bottom 13. Accordingly, when the magnet 26 opposed to the stator 102 has such an axial dimension as to reach the bottom 13 of the frame 11, the axial dimension of the overall rotor is increased more than required. On the other hand, in the foregoing rotor, the magnet 26 is formed so as to reach the stepped portion 16 of the frame 11. Accordingly, the axial dimension of the magnet 26 can be reduced to be substantially equal to the length of the stator and accordingly prevented from being excessively increased. Consequently, the weight and manufacturing cost of the rotor can further be reduced. Additionally, since the orientation of magnetic particles contained in the magnetic resin has anisotropy, the magnetic force of each magnetic pole 27 can be increased.

The frame 11 is formed with the axially elongated holes 18 each of which is located between the magnetic poles 27 of the magnet 26. Each hole 18 has the length L1 equal to or larger than one half of the axial dimension L2 of the magnet 26. Accordingly, only a small amount of magnetic flux leaks through narrow portions of the frame 11 located at both opposite sides of each hole 18 during the bestowment of anisotropy as shown by arrows A' in FIG. 2 and the reminder is blocked by each hole 18. Consequently, the magnet 26 can be rendered anisotropic with respect to the poles thereof more reliably. Further, since the magnetic resin also fills the holes 18, the magnet 26 can reliably be prevented from rotation relative to the frame 11. Thus, the strength of the magnet 26 relative to the frame 11 can be improved. Furthermore, since the magnetic resin also fills the holes 17 formed in the stepped portion 16 of the frame 11, the strength of the magnet 26 relative to the frame 11 can further be improved.

The portion of the frame 11 integrated with the magnet 26 has the axial dimension L3 shorter than the axial dimension L2 of the magnet 16. Consequently, since passages through which the magnetic flux leaks along the frame 11 are narrowed, the leakage flux can be reduced more reliably. Thus, the magnet 26 can reliably be rendered anisotropic with respect to the poles thereof, and moreover, the size, weight and manufacturing cost of the rotor can be reduced more reliably. Furthermore, since the lower end of the magnet 26 protrudes from the frame 11 as viewed in FIG. 1, an accuracy in the detection of a rotational position signal can be improved.

Figure 7:
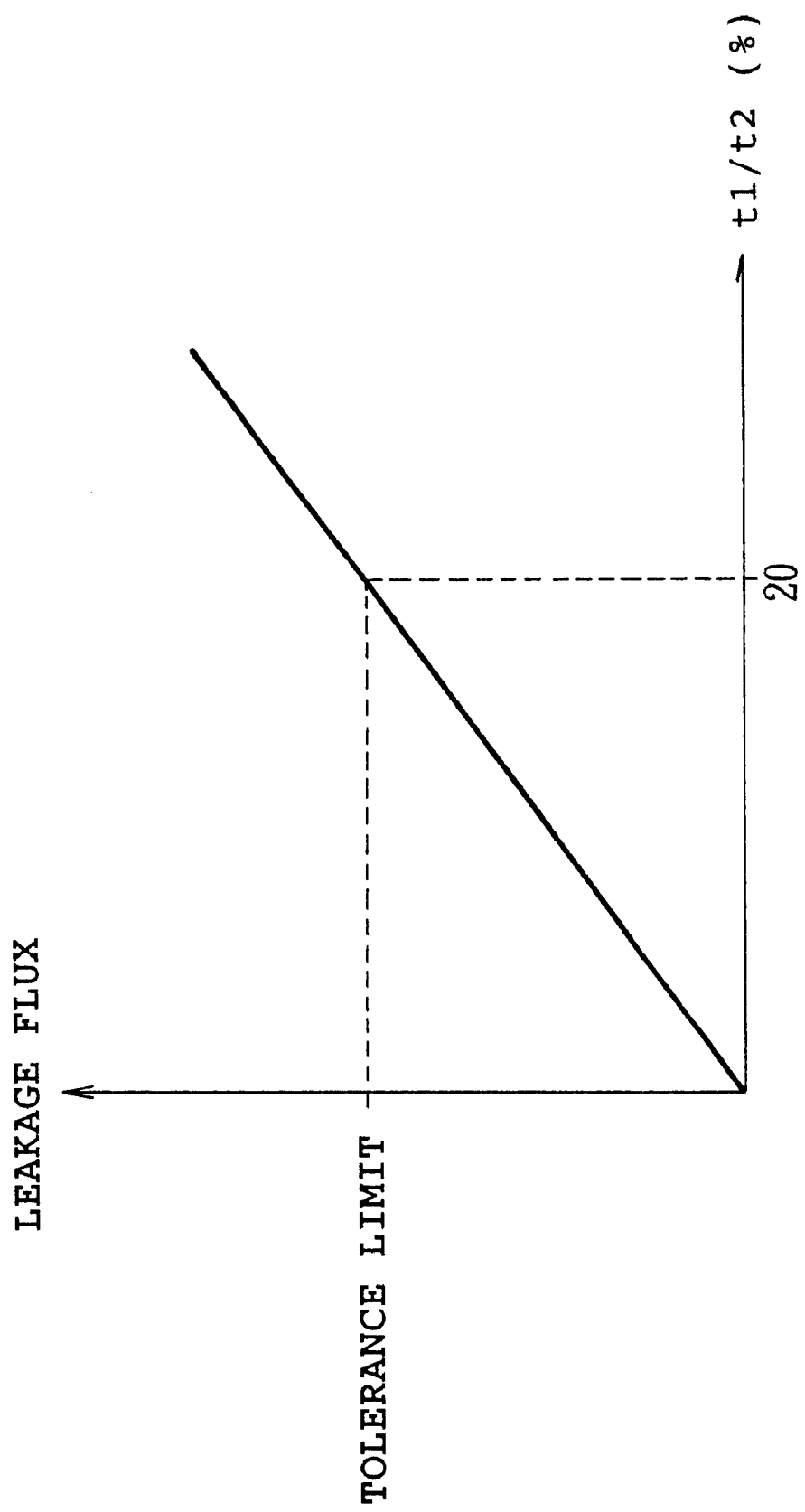
FIG. 7 is a graph showing the relationship between a ratio of the thickness t1 of a frame to the thickness t2 of a magnet 26 and an amount of leakage flux through the frame.

The thickness t1 of the frame 11 is equal to or smaller than 20% of a thickness t2 of the magnet 26. Consequently, since the passages through which the magnetic flux leaks along the frame 11 are narrowed, the leakage flux can be reduced more reliably. Thus, the magnet 26 can reliably be rendered anisotropic with respect to the poles thereof. FIG. 7 shows the relationship between a ratio (%) of the thickness t1 of the frame 11 to the thickness t2 of the magnet 26 and an amount of leakage flux through the frame 11 during the bestowment of anisotropy on the magnet 26. As obvious from FIG. 7, the amount of leakage flux through the frame 11 can be reduced to or below the tolerance limit when the aforesaid ratio is at or below 20%. Moreover, the weight and manufacturing cost of the rotor can be reduced when the aforesaid ratio is at or below 20%.

The magnet 26 is formed so that the central portion of each magnetic pole 27 has the thickness larger than the other portion thereof. The air gap between each magnetic pole 27 of the magnet 26 is smallest at the central portion of the magnetic pole and largest at both ends of the magnetic pole. Accordingly, the magnetic resistance in the air gap is smallest at the central portion of each magnetic pole 27 and largest at both ends of the magnetic pole 27. Since the distribution of flux density in the air gap is approximated to a sine wave when regarded as a wave, an amount of harmonic component is reduced and accordingly, torque ripple is reduced such that vibration and noise can be reduced.

The magnetic poles 28 are magnetized on the end of the magnet 26 protruding from the frame 11 or the underside of the magnet. The magnetic poles 28 has the number twice as large as that of the magnetic poles 27 opposed to the stator 102. Consequently, the accuracy in the detection of rotational position signal by the magnetic poles 28 can be improved. The outer circumferential face of the magnet 26 may be magnetized instead of the underside thereof.

In making the foregoing rotor, the molten magnetic resin is poured into the molding die through the gates 25 formed at the open end 12 side in the frame 11. The magnetic resin is a mixture of plastic serving as a binder and granular magnetic substance and the composition renders the molding difficult. In the foregoing embodiment, however, the molten magnetic resin is easily poured into the die without being blocked by the frame 11, so that the molding can be rendered easier.

The number of the gates 25 is preferably equal to the number of magnetic poles of the magnet, and the gates 25 are preferably formed at regular intervals. Consequently, since the molten magnetic resin is uniformly poured into the die, the magnetic force can uniformly be distributed among poles 27. Additionally, the number of the gates 25 may be a divisor of the number of magnetic poles 27 of the magnet 26. In this case, too, the gates 25 are preferably formed between the magnetic poles 27 for the purpose of uniforming the distribution of the magnetic force.

FIGS. 8A to 8C illustrate a second embodiment of the invention. Holes 31 are formed in the frame 11 instead of the holes 18. Each hole 31 is formed by cutting and raising up a part of the side wall 15 of the frame 11 at both circumferential sides with both axial sides being continuous to the other portion of the frame 11. Although each hole 31 is not a through hole, each hole can reduce the magnetic flux leaking through the frame 11 during the bestowment of anisotropy on the magnet 26. Further, each hole 31 can improve the strength of the magnet 26 relative to the frame 11 as each hole 18 can.

FIGS. 9A to 9C illustrate a third embodiment of the invention. Holes 32 are formed in the frame 11 instead of the holes 18. Each hole 32 is formed by cutting and raising up a part of the side wall 15 of the frame 1 at one circumferential side and both axial sides with the other circumferential side being continuous to the other portion of the frame 11. Although each hole 32 is not a through hole, each hole can reduce the magnetic flux leaking through the frame 11 during the bestowment of anisotropy on the magnet 26. Further, each hole 32 also can improve the strength of the magnet 26 relative to the frame 11 as each hole 18 can.

FIGS. 10A to 10C illustrate a fourth embodiment of the invention. Holes 33 are formed in the frame 11 instead of the holes 18. Each hole 33 is formed by cutting and raising up a part of the side wall 15 of the frame 11 at one axial side and both circumferential sides with the other axial side being continuous to the other portion of the frame 11. Although each hole 33 is not a through hole, each hole can reduce the magnetic flux leaking through the frame 11 during the bestowment of anisotropy on the magnet 26. Further, each hole 33 also can improve the strength of the magnet 26 relative to the frame 11 as each hole 18 can.

Figure 11:
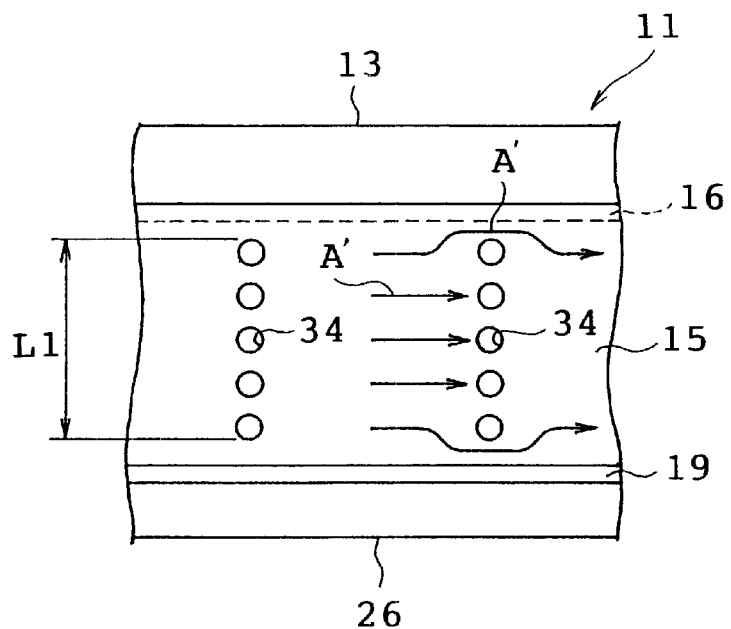
FIG. 11 is a view similar to FIG. 2, showing the rotor of a fifth embodiment in accordance with the invention.

FIG. 11 illustrates a fifth embodiment of the invention. The frame 11 has a plurality of holes 34 formed therein so as to be aligned axially, instead of the holes 18. These holes 34 also can reduce the magnetic flux leaking through the frame 11 during the bestowment of anisotropy on the magnet 26. Further, each hole 34 also can improve the strength of the magnet 26 relative to the frame 11 as each hole 18 can.

Figure 12:
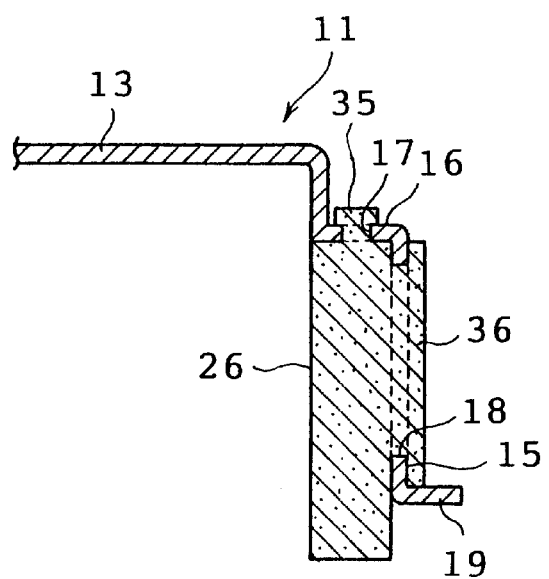
FIG. 12 is a view similar to FIG. 1, showing the rotor of a sixth embodiment in accordance with the invention.

FIG. 12 illustrates a sixth embodiment of the invention. The magnetic resin is caused to project outward from each hole 17 and each hole 18, thereby being formed into projections 35 and 36. The magnet 26 can reliably be prevented from falling off from the frame 11 since each of the projections 35 and 36 is formed so as to have an external shape larger than each hole 17 or 18. Thus, the projections 35 and 36 can reliably improve the strength of the magnet 26 relative to the frame 11.

The present invention may be applied to a rotor for an electric motor of the inner rotor type in which the rotor is disposed inside a stator.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A rotor for an electric motor including a rotational shaft and a stator having a stator core, comprising:

a frame fixed to the rotational shaft of the motor so as to be rotated with the rotational shaft; and a magnet molded from a molten magnetic resin and disposed at a stator core side of the frame and so as to be integrated with the frame.

2. A rotor according to claim 1, wherein the frame has a stepped portion in an axial middle thereof with respect to the rotational shaft and the magnet is molded from the molten magnetic resin having reached the stepped portion of the frame.

3. A rotor according to claim 1, wherein the magnet is anisotropic with respect to magnetic poles thereof.

4. A rotor according to claim 1, wherein the frame has an axially elongated hole or a plurality of axially aligned holes at a position between magnetic poles of the magnet with respect to the rotational shaft.

5. A rotor according to claim 4, wherein the frame has a stepped portion in an axial middle thereof with respect to the rotational shaft and the magnet is integrated with the frame by filling both the stepped portion and the elongated hole or axially aligned holes with the molten magnetic resin.

6. A rotor according to claim 4, wherein the elongated hole or the axially aligned holes are formed by cutting and raising up a part of the frame.

7. A rotor according to claim 1, which includes a portion where the frame and the magnet are integrated with each other, wherein the portion has an axial dimension shorter than the magnet with respect to the rotational shaft.

8. A rotor according to claim 1, wherein the magnet is formed so that a central portion of each magnetic pole has a thickness larger than the other portion thereof.

9. A rotor according to claim 1, wherein the magnet has an end and a portion opposite the stator and is magnetized so that the end has a larger number of magnetic poles than the portion opposite the stator.

* * * * *